United States Patent
Chapman et al.

(10) Patent No.: US 7,114,654 B2
(45) Date of Patent: *Oct. 3, 2006

(54) RFID ENCODER AND VERIFIER

(75) Inventors: Theodore A. Chapman, San Juan Capistrano, CA (US); Van L. Le, Mission Viejo, CA (US); Carol D. Ballesty, Aliso Viejo, CA (US); Andrew W. Edwards, Irvine, CA (US)

(73) Assignee: Printronix, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/825,005

(22) Filed: Apr. 15, 2004

(65) Prior Publication Data

US 2005/0230478 A1    Oct. 20, 2005

(51) Int. Cl.
- G06K 7/10    (2006.01)
- G06K 15/00    (2006.01)
- H04Q 5/22    (2006.01)

(52) U.S. Cl. .................... 235/462.01; 235/462.07; 235/462.13; 340/10.51

(58) Field of Classification Search .......... 235/472.02, 235/383, 385, 435, 449, 451, 487, 492, 493, 235/462.15, 462.01, 462.07, 462.13; 340/10.51–10.52, 340/572.1, 5.6, 5.61, 5.65–5.67; 400/76
See application file for complete search history.

(56) References Cited

U.S. PATENT DOCUMENTS

| | | | |
|---|---|---|---|
| 5,229,587 A * | 7/1993 | Kimura et al. .............. 235/432 |
| 5,602,377 A * | 2/1997 | Beller et al. ............ 235/462.15 |
| 5,838,253 A | 11/1998 | Wurz et al. |
| 6,218,942 B1 * | 4/2001 | Vega et al. .............. 340/572.1 |
| 6,246,326 B1 * | 6/2001 | Wiklof et al. ............ 340/572.1 |
| 6,480,100 B1 * | 11/2002 | Frieden et al. ............. 340/10.1 |
| 6,593,853 B1 * | 7/2003 | Barrett et al. ............ 340/572.1 |
| 6,597,465 B1 * | 7/2003 | Jarchow et al. ............ 358/1.12 |
| 6,816,075 B1 * | 11/2004 | Grunes et al. ........... 340/572.1 |
| 6,830,181 B1 * | 12/2004 | Bennett ..................... 235/440 |
| 6,899,476 B1 * | 5/2005 | Barrus et al. ................. 400/76 |
| 2001/0048361 A1 * | 12/2001 | Mays et al. .............. 340/10.51 |
| 2002/0047777 A1 * | 4/2002 | Casden .................... 340/10.32 |
| 2002/0105424 A1 * | 8/2002 | Alicot et al. ............. 340/572.1 |
| 2002/0167406 A1 * | 11/2002 | Garber et al. ............ 340/572.7 |
| 2002/0196126 A1 * | 12/2002 | Eisenberg et al. ......... 340/10.2 |
| 2003/0057276 A1 * | 3/2003 | Appalucci et al. .......... 235/382 |
| 2003/0062119 A1 | 4/2003 | Hohberger et al. |
| 2003/0063139 A1 * | 4/2003 | Hohberger et al. ............ 347/2 |

(Continued)

FOREIGN PATENT DOCUMENTS

EP    0595 549 A    5/1994

(Continued)

*Primary Examiner*—Daniel Walsh
(74) *Attorney, Agent, or Firm*—MacPherson Kwok Chen & Heid LLP; Tom Chen

(57) ABSTRACT

An RFID encoder is used in conjunction with a barcode print and apply system. The RFID encoder utilizes information obtained from a data stream from a host computer, from a corresponding barcode label, or other source to program an RFID label. The programmed label can then be applied with an integrated applicator or an external applicator. The RFID encoder can also verify that an RFID tag or label has been properly encoded and has the same content as the corresponding barcode label. The RFID can further verify that the barcode has been properly printed. If both barcode and RFID tag contain the correct data, both types of labels are attached to a package, enabling the package to be read optically and with radio frequency signals.

27 Claims, 8 Drawing Sheets

U.S. PATENT DOCUMENTS

| | | | |
|---|---|---|---|
| 2003/0189490 A1* | 10/2003 | Hogerton et al. | 340/572.8 |
| 2004/0032443 A1* | 2/2004 | Moylan et al. | 347/19 |
| 2004/0113791 A1* | 6/2004 | Salim et al. | 340/572.3 |
| 2004/0129769 A1* | 7/2004 | Kovach | 235/375 |
| 2004/0149826 A1* | 8/2004 | Alleshouse | 235/432 |
| 2004/0257203 A1* | 12/2004 | Maltsev et al. | 340/10.1 |
| 2004/0257231 A1* | 12/2004 | Grunes et al. | 340/572.1 |
| 2005/0001719 A1* | 1/2005 | Aupperle et al. | 340/539.13 |
| 2005/0029350 A1* | 2/2005 | Jusas et al. | 235/451 |
| 2005/0058483 A1* | 3/2005 | Chapman et al. | 400/76 |
| 2005/0073417 A1* | 4/2005 | Mathewson et al. | 340/572.1 |
| 2005/0098620 A1* | 5/2005 | Dunlap | 235/375 |
| 2005/0116034 A1* | 6/2005 | Satake et al. | 235/432 |
| 2005/0139663 A1* | 6/2005 | Hopwood et al. | 235/385 |
| 2005/0139667 A1* | 6/2005 | Barrus et al. | 235/432 |
| 2005/0218219 A1* | 10/2005 | Sano et al. | 235/383 |

FOREIGN PATENT DOCUMENTS

| | | |
|---|---|---|
| EP | 0 615 285 A | 9/1994 |
| EP | 1 548 630 A | 6/2005 |
| EP | 1 589 469 A | 10/2005 |

* cited by examiner

RFID ENCODER AND VERIFIER

BACKGROUND

1. Field of the Invention

The present invention relates to labeling systems, and in particular, to programming and/or verifying RFID labels prior to application onto products already having optically readable information such as barcodes.

2. Related Art

Typically, products stored in cartons or boxes are identified by a label on the outside of the carton or box. Identifying information may also be printed directly onto the carton with inkjet or any other suitable printing technology. The label may have optically readable information, such as a UPC barcode. These labels allow optical readers using a laser beam to scan the information contained thereon, such as description, price, date packaged, or any other usable data. One disadvantage of optically readable labels is that the optical reader and the label must be within a specific spatial relationship to each other, such as within a line of sight or along a perpendicular scan direction, or is limited in range by the optical reader.

A more recent type of label uses RFID or Radio Frequency Identification tags to store information. RFID uses radio frequency signals to acquire the data from the data within range of an RFID reader. RFID transponders or tags, either active or passive, are typically used with the RFID reader to read information from the RFID tag embedded in a label. RFID tags and labels can be obtained through companies such as Alien Technology Corporation of Morgan Hill, Calif.

One advantage of RFID labels is that line of sight is no longer required to read the label. This is a significant advantage since with barcodes, anything blocking the laser beam from the barcode would prevent the barcode from being read. Using radio frequencies allows RFID labels to be read through solid objects located between the RFID label and the RFID reader.

Even though RFID labels are not optically read, there are advantages to placing optical information on a label so that the package has both optical information and RFID on the package, such as having the ability to read the label using more than one technology. This may be beneficial because RFID label technology is not as widespread as barcode technology, and many businesses or users may not have suitable RFID readers to read the RFID tag. However, because RFID label technology is not as widespread, many users may only have barcode applicators for placing the barcode label on the package, thereby preventing placement of RFID labels. Therefore, in order for such users to have both barcode and RFID information on a package, they could purchase application systems that apply labels having both optically readable information and RFID information contained in a single label. These RFID labels can be produced in a printer, such as a thermal printer, by first printing optically readable information on the label and then programming or encoding the RFID tag embedded within the label. The label can then be placed on the package, which is readable by both a barcode scanner and an RFID reader. However, such printers and applicators can be costly.

Accordingly, there is a need for label application systems that can apply RFID labels onto packages that overcomes the deficiencies in the prior art as discussed above.

SUMMARY

According to one aspect of the invention, an RFID device that programs an RFID tag using information from a signal, such as a data stream or data read from a barcode, either applies the RFID label to a package or prepares the label for application by a separate applicator. After programming, the RFID tag may be read to verify its proper programming. The RFID device can be used in conjunction with a barcode print and apply device, barcode reader, or any other suitable device. Thus, the present invention allows an RFID tag to be programmed using available information, such as a data stream or barcode, and applied to a package that contains a barcode or other optically readable label using existing systems, such that the package has both RFID and optically readable information.

In one embodiment, both the RFID device and the barcode device utilize information contained in the same data stream from a host computer. The data stream contains information and commands for printing optical information on a label, as well as RFID information. The RFID device uses information in the same data stream to program an RFID label and apply the label to the package. As a result, a package has both an optically readable label (such as a barcode label) and an RFID label or tag.

According to one embodiment, a conventional print and apply device, for printing barcodes or other optically readable information on a label, and applying the printed label onto a package, utilizes information contained in a data stream from a host computer. An RFID device receives the same data stream from the host computer, which can be from different manufacturers such as, but not limited to, Printronix, Zebra, TEC, Intermec, and Sato. Since each manufacturer may also have a different language and interface, the RFID device includes interpreters, emulations, or look-up or substitution tables, that allow the RFID applicator device to convert the information needed for programming an RFID tag or label.

In one embodiment, a barcode scanner or verifier coupled to the RFID device scans the printed barcode label on the package to determine whether the barcode label was properly printed based on the information contained in the data stream. For example, the barcode may be unreadable or represent incorrect information. If the barcode label is found defective, the label or package can be rejected or processed in other ways. However, if the barcode is readable and contains the proper information, the RFID device uses the information in the data stream to program an RFID tag. In another embodiment, the RFID device uses the information obtained from scanning the barcode to encode the RFID tag. The RFID device can then read (verify) that the tag was properly programmed. If the tag cannot be verified, the RFID tag is defective, and an appropriate action can be taken, such as rejecting the tag.

However, if the RFID tag is determined to be properly programmed to match the information on the corresponding barcode label, the RFID label is applied to the package by the RFID device. As a result, the package contains both an optically readable label and an RFID label without the need to purchase costly equipment for applying a label or labels having both types of stored information. The present invention allows the user to add on to existing barcode label print and apply systems so that both types of labels can be placed on packages. In addition, the present invention verifies that both the barcode information and the RFID information have the same content on the package.

It is noted that some company's thermal printers can print labels based on other company's languages allowing easy migration into competitor applications. Thus, the concept of converting the barcode or electronic product code (EPC) command into an RFID command can be applied to a thermal printer that supports not only its standard programming language but also any competitor's languages that the printer happens to support.

This invention will be more fully understood in conjunction with the following detailed description taken together with the following drawings.

BRIEF DESCRIPTION OF THE DRAWINGS

Use of the same or similar reference numbers in different figures indicates same or like elements.

DETAILED DESCRIPTION OF THE PREFERRED EMBODIMENTS

Figure 1:
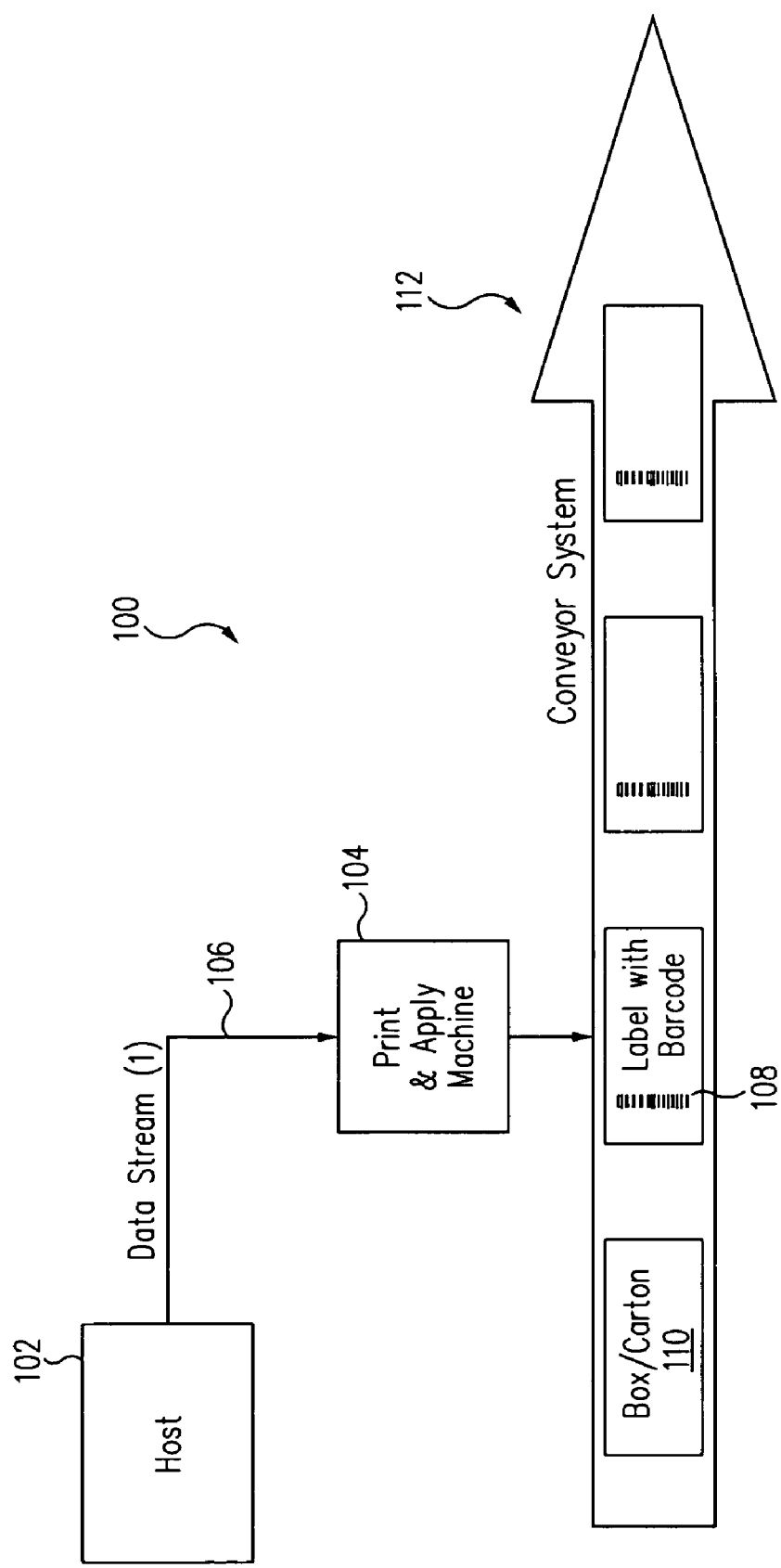
FIG. 1 shows a block diagram of a conventional barcode label print and apply system.

FIG. 1 shows a block diagram of a conventional print and apply system 100 for applying optically readable or barcode labels. System 100 includes a host computer 102, which can be a conventional personal computer coupled to a local area network (LAN). A print and apply device 104 receives information via a data stream 106 from host computer 102 that includes a host application, typically specific to the system through an electrical and software interface. The electrical interface can be any suitable communication means, such as, but not limited to, a serial or parallel physical link, an Ethernet connection, or a wireless link. The data stream contains various commands, such as line, box, font, and barcode commands, for printing lines, boxes, text, barcodes, and other images. The data stream is transmitted to the printer portion of device 104 in specific languages to cause the printer to print an image on a label or other media.

Typically, each manufacturer uses a unique and specific language or software interface, such as PGL (Programmable Graphics Language used and supported by Printronix of Irvine, Calif.), ZPL (Zebra Programming Language used and supported by Zebra Technologies of Illinois), and IPL (Intermec Programming Language used and supported by Intermec of Washington). Other manufacturers with specific languages include TEC and Sato.

Print and apply device 104 may include a printer data control section that receives the data stream and a printer engine control section for printing the label, as is known in the art. The printer engine control section manages the printer components (e.g., the print head, ribbon motors, platen motor and roller, sensors, etc.) to cause a printed image to be created on the label, based on the received image data.

The printer can be a thermal printer or any other suitable printer. The printer prints the optical information on labels as they pass through the print station. The labels may be in a roll and the roll unwound to expose each label to the print head for printing. After the label is printed, an application section of device 104 applies a printed label 108 to a package 110. Print and apply device 104 is known in the art, such as available through Label-Aire, Weber, and Diagraph.

A conveyer system 112 moves packages 110, which can be boxes, cartons, or any other items on which label 108 is to be attached. As shown in FIG. 1, the movement of packages 110 is from left to right. As each package 110 passes by the application section of device 104, a label 108 with printed barcode information is attached. Note that barcode, as used herein, may refer to any optically readable format and is not limited to barcodes. The packages 110 can then be moved along conveyer system 112 for sorting or any other suitable processing. In systems, such as this, only a barcode label is printed and applied.

Figure 2:
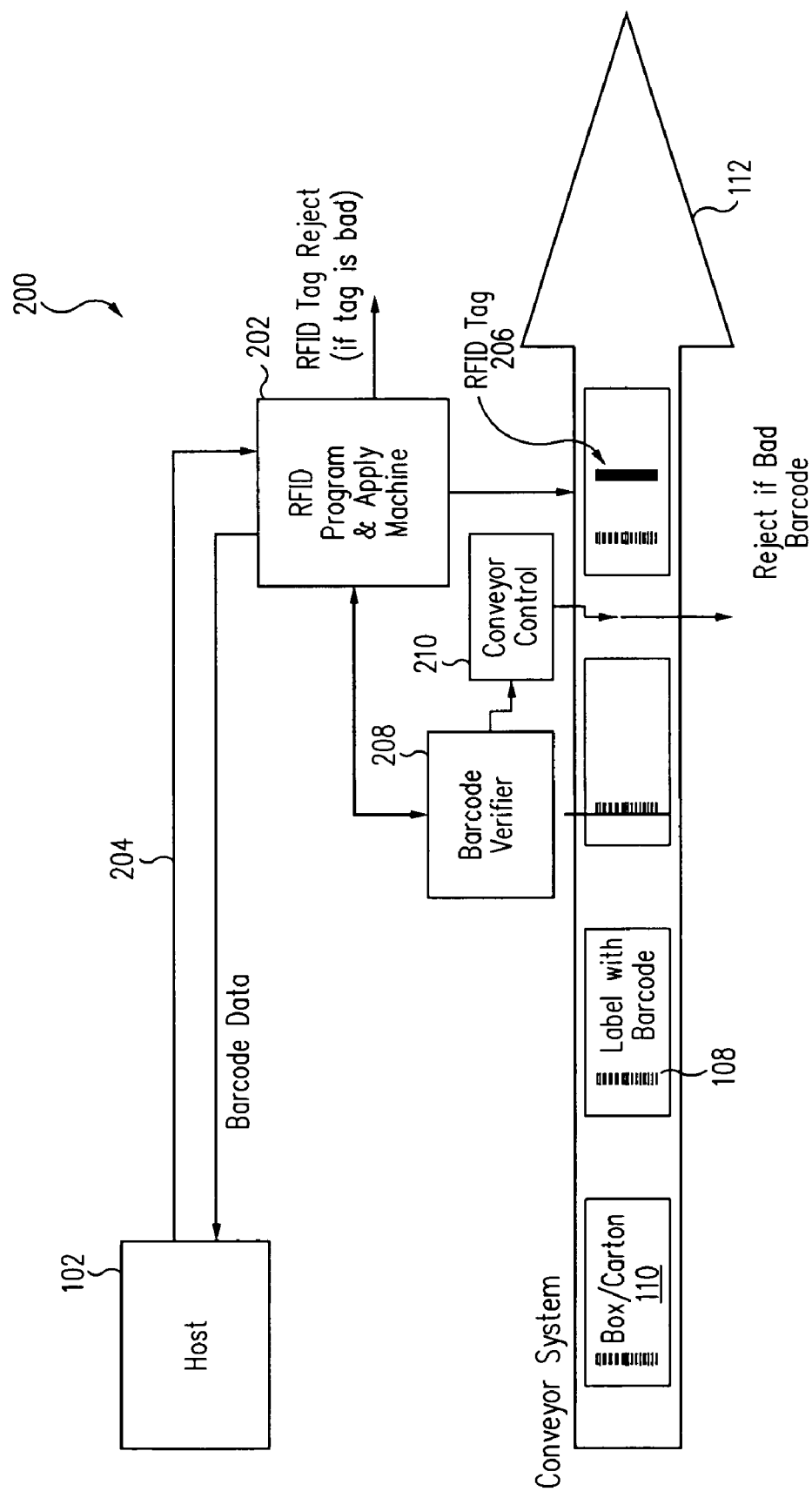
FIG. 2 shows a block diagram of an RFID label program or read and apply system that can be used in conjunction with the barcode label print and apply system of FIG. 1, where the barcode label has already been applied.

FIG. 2 is a block diagram of an RFID encoding system 200 according to one embodiment of the present invention. Packages 110 are moved along conveyer system 112 to an RFID encoder 202 that encodes or programs an RFID tag based on existing information, such as from a data stream 204 or from information read from a barcode 108 on a package 110. Note that encoder 202 in FIG. 2 and other figures is labeled as "RFID Program & Apply Machine". However, depending on the required function, RFID Program & Apply Machine can be other types of machines, such as RFID program, RFID verify, RFID print and apply, and RFID program, print, and apply.

In one embodiment, the existing information is obtained from data stream 204 transmitted by host computer 102. Data stream 204 includes commands, information, or instructions for encoding RFID information on a tag. RFID encoder 202 processes the necessary signal components and uses the information to program or encode an RFID tag. RFID encoder 202 can then verify that the tag was programmed correctly, if desired, as will be discussed in greater detail below. After programming (and possibly verifying), RFID encoder 202 either applies the RFID tag or label 206 onto package 110 or sends the RFID label 206 to a separate RFID applicator for application onto package 110, where package 110 has a corresponding barcode label 108 attached.

In another embodiment, the existing information is obtained through a barcode scanner 208, and thus host computer 102 may not be needed to transmit the programming information. In such embodiments, pre-printed optically readable information on the package or object is read and used for the RFID programming. Conveyer system 112 moves packages 110 with attached barcode labels 108 across barcode scanner 208. Note that barcode scanner 208 can also function as a verifier to verify that the barcode was properly written to, as will be discussed below. As package 110 moves through the scanning region of barcode scanner 208, the barcode information contained in barcode label 108 is read and transmitted to RFID encoder 202. RFID encoder 202 then uses this information to program or encode the corresponding RFID information onto an RFID tag. The RFID encoder can also transmit the barcode information to the host computer 102 to use to retrieve the corresponding RFID information for storage and/or processing. Note that currently, there is not enough information on the barcode alone to generate the data required to program the tag. That complete data must be retrieved from a database, using the barcode as an index. As with the above embodiment, RFID encoder 202 can perform an RFID verifying operation, apply the RFID label, or send the programmed RFID label to an RFID applicator to apply the label to the package.

Other functions of RFID encoding system 200 include a mechanism for rejecting bad barcode labels and/or bad RFID tags. For example, packages 110 moved across barcode scanner/verifier 208 have their attached labels scanned. Barcode scanner/verifier 208 determines if barcode label 108 is good or bad. If the label is bad (e.g., unreadable), the package is rejected, such as via a conveyer control 210. If the label is good, the barcode data is sent to RFID encoder 202, which utilizes data stream 204 from host computer 102 to compare barcode data from the data stream to the barcode data on the label received from scanner/verifier 208. If the data and image match, an RFID tag or label is programmed and verified that the programming matches with the printed barcode. The RFID tag is then reread, and depending on whether the tag is good, either applies a separate RFID label to the package or rejects the label as having a defective RFID tag. In the embodiment of FIG. 2, processing begins after a barcode or other optically readable label has already been applied to a package. However, other embodiments utilize the RFID encoder with a barcode print and apply system such that processing involves applying both the barcode label as well as the RFID label.

Figure 3:
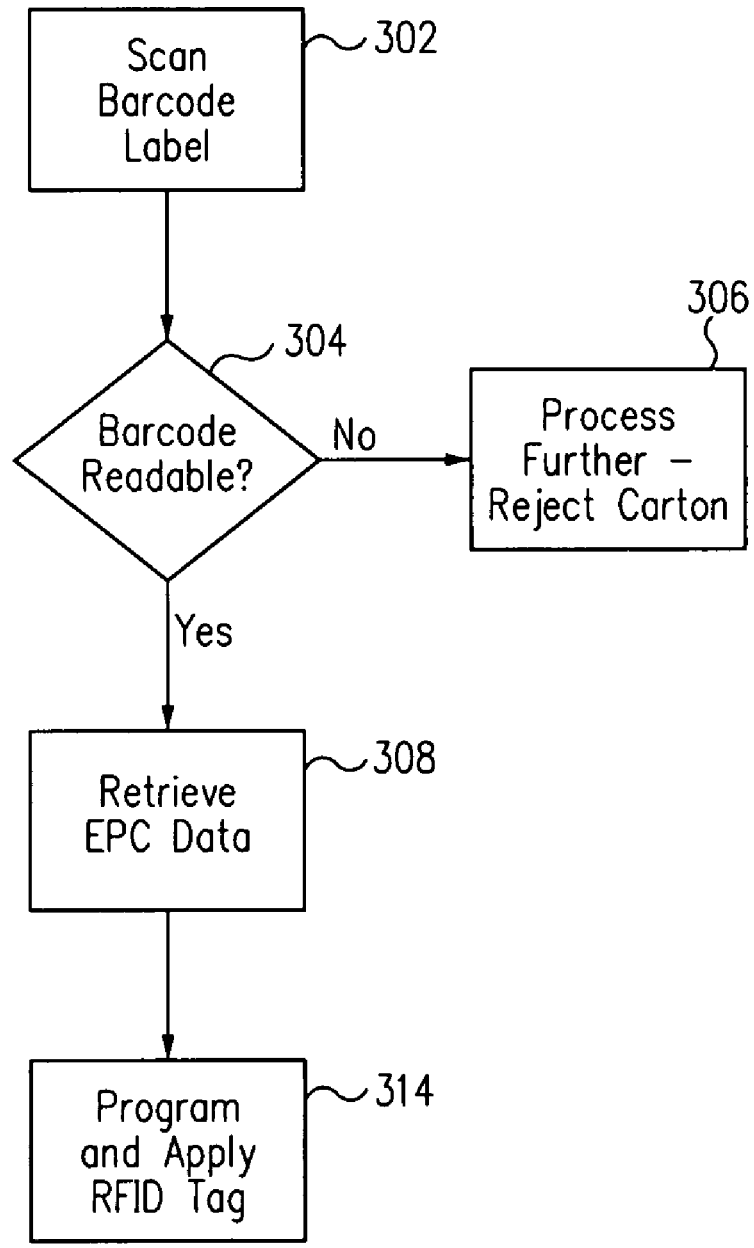
FIG. 3 is a flow chart showing a process for verifying the barcode on a printed label for use with the system of FIG. 2 according to one embodiment.

FIG. 3 is a flow chart showing processing for one embodiment of the system of FIG. 2. In step 302, a barcode label on a package is scanned, such as by a barcode scanner/verifier. If the information on the barcode label is not readable, as determined in step 304, an appropriate action can be taken in step 306, such as rejecting the package. However, if the information on the barcode is readable, the RFID programming information is retrieved in step 308, where the RFID information can be EPC data or any other type of data. An RFID encoder utilizes the information obtained in step 308 to program or encode an RFID tag in step 314. After programming, subsequent actions can be taken, such as verifying that the programmed data matches the barcode data and applying the RFID tag or label to the package containing the corresponding barcode label.

Figure 4:
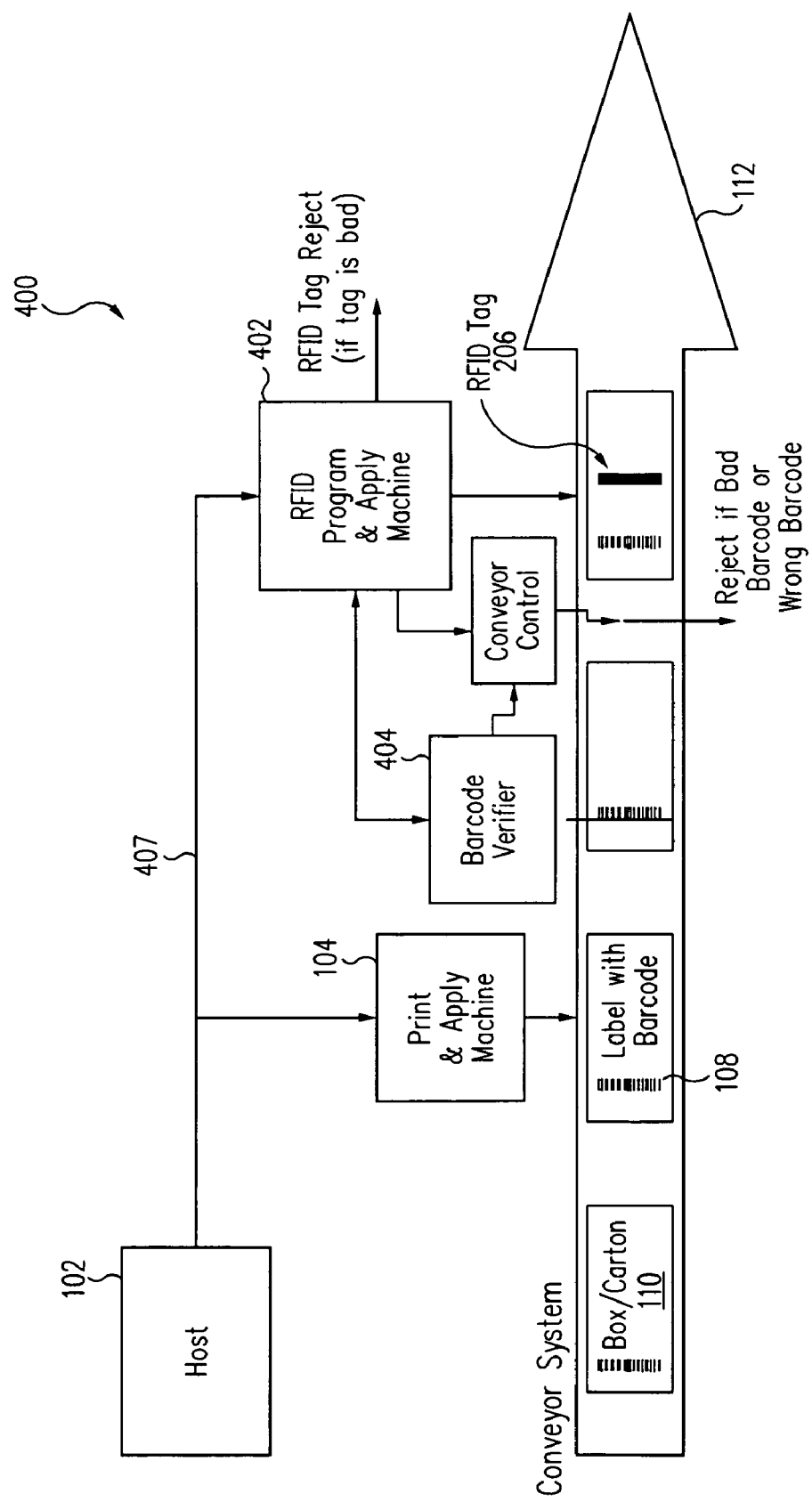
FIG. 4 is a block diagram of an RFID label program and apply system according to another embodiment, where both the barcode and RFID labels are applied.

FIG. 4 is a block diagram of an RFID verify and apply system 400 according to another embodiment of the present invention in which the RFID system 400 is used in conjunction with an existing barcode print and apply machine 104 to attach both a barcode label and an RFID label. System 400 includes an RFID program and apply device 402 coupled to barcode scanner/verifier 404. RFID program and apply device 402 extracts information from a data stream 407, transforms or converts portions of the data stream, if needed, and uses the portion to program the RFID tag. This portion is also used in conjunction with barcode scanner/verifier 404 to ensure that the RFID information, such as EPC information, in the data stream is a match to the printed barcode.

It is noted that the scanner/verifier does not need the data stream to know if the barcode has been printed as a bad barcode, since the scanner can make this determination based on information gathered during a scan. The data within the data stream is used to associate the barcode with the data stream, such that the needed RFID data can be extracted. Also, data stream 407 may be parsed so that the portion needed by the barcode device is transmitted to print and apply machine 104 and the portion needed by the RFID device is transmitted to RFID device 402.

Figure 5:
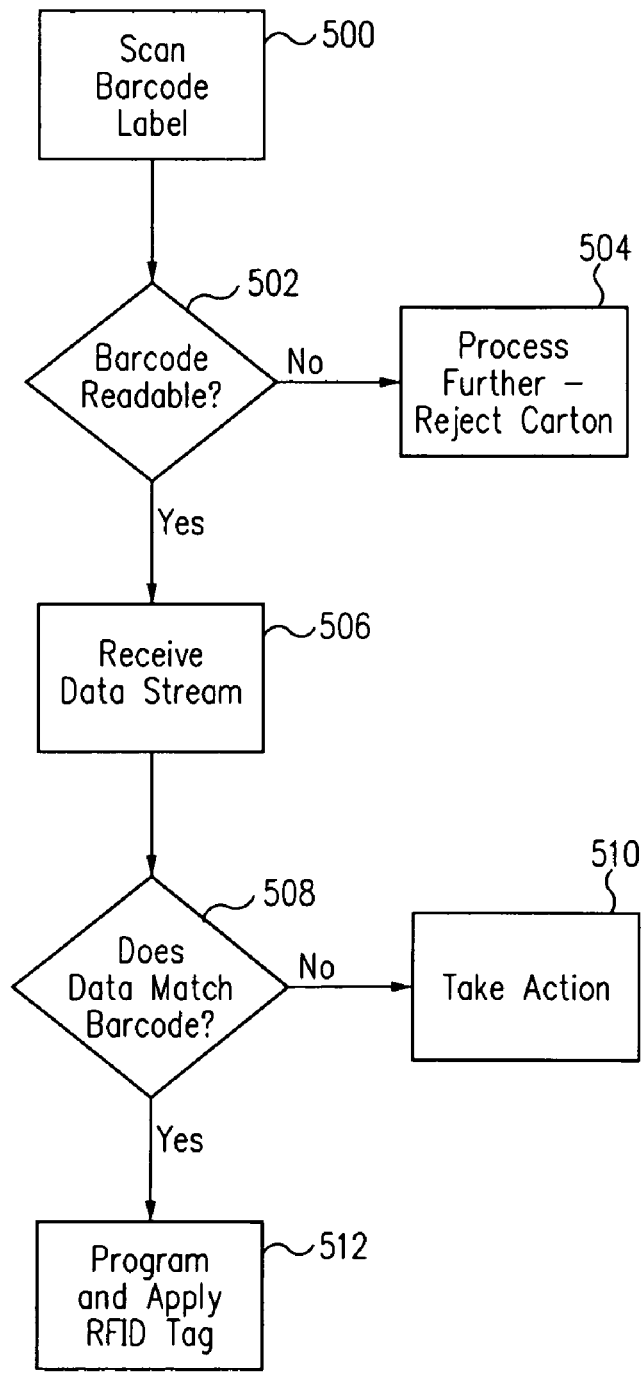
FIG. 5 is a flow chart showing a process for programming and applying an RFID label according to one embodiment.

FIG. 5 is a flow chart showing one embodiment. In step 500, barcode scanner/verifier 404 scans label 108 as it passes by, such as with a conventional barcode scanner using a laser beam or other suitable means. The printed barcode on label 108 may have been printed improperly, resulting in either an unreadable barcode or a label having erroneous data. Thus, after a scanning, barcode scanner/verifier 404 determines first, in step 502, whether the barcode is readable. If the barcode on label 108 is not readable, then barcode scanner/verifier 404 communicates this information for further processing in step 504. For example, the package with the defective label may be rejected, i.e., routed to a "reject" bin, or a new barcode label may be printed and applied. Other actions may also be taken, as desired by the user, such as programming and applying an RFID label, as will be discussed below, even though the barcode label is defective.

In step 506, the RFID program and apply device 402 receives information contained in data stream 407 transmitted by host computer 102. Data stream 407 can be the same as what is received by print and apply device 104 if RFID information is included. For example, the data stream may contain various commands, such as line, box, font, and barcode commands, for printing lines, boxes, text, barcodes, and other images as well as RFID information, such as EPC information or RFID commands. The information in the data stream is used by print and apply device 104 to print the appropriate barcode or other optical information on the label. This same information is received by RFID program and apply device 402 by any suitable communication means, such as, but not limited to, a serial or parallel physical link, an Ethernet connection, or a wireless link.

If barcode scanner/verifier 404 determines label 108 is readable, it then compares, in step 508, the scanned information in step 500 with the data in the data stream 407 to determine whether the barcode information on the label matches the intended information to be programmed. The comparison can be performed either with barcode scanner/verifier 404, in which case the intended programming information is received from RFID program and apply device 402, or with RFID program and apply device 402, in which case the scanned information is received from barcode scanner/verifier 404. Comparison is by any suitable conventional and well known method. If it is determined that the printed barcode does not match the data from the data stream, the RFID program and apply device can take an appropriate action in step 510. For example, the package with the misprinted label can be rejected, a label reprinted and applied (and checked), or an indication on the package that the label is misprinted. As with the case where the label is unreadable, an RFID label can still be programmed and applied to the package.

If, however, label 108 is printed properly, i.e., with readable and correct information, RFID program and apply device 402 proceeds to program an RFID tag and apply the RFID label onto package 110 in step 512 according to one embodiment. Device 402 includes an RFID programming section that programs a roll of RFID labels or media having an RFID tag embedded in each label 206. RFID tags may be conventional passive or active tags, such as manufactured by Alien Technology Corporation. If the programmed RFID label 206 is verified to have correct and matching data with barcode label 108, RFID label 206 is applied to package 110.

As a result, the package has both barcode and RFID labels, with both labels verified that they convey the same correct information.

Figure 6:
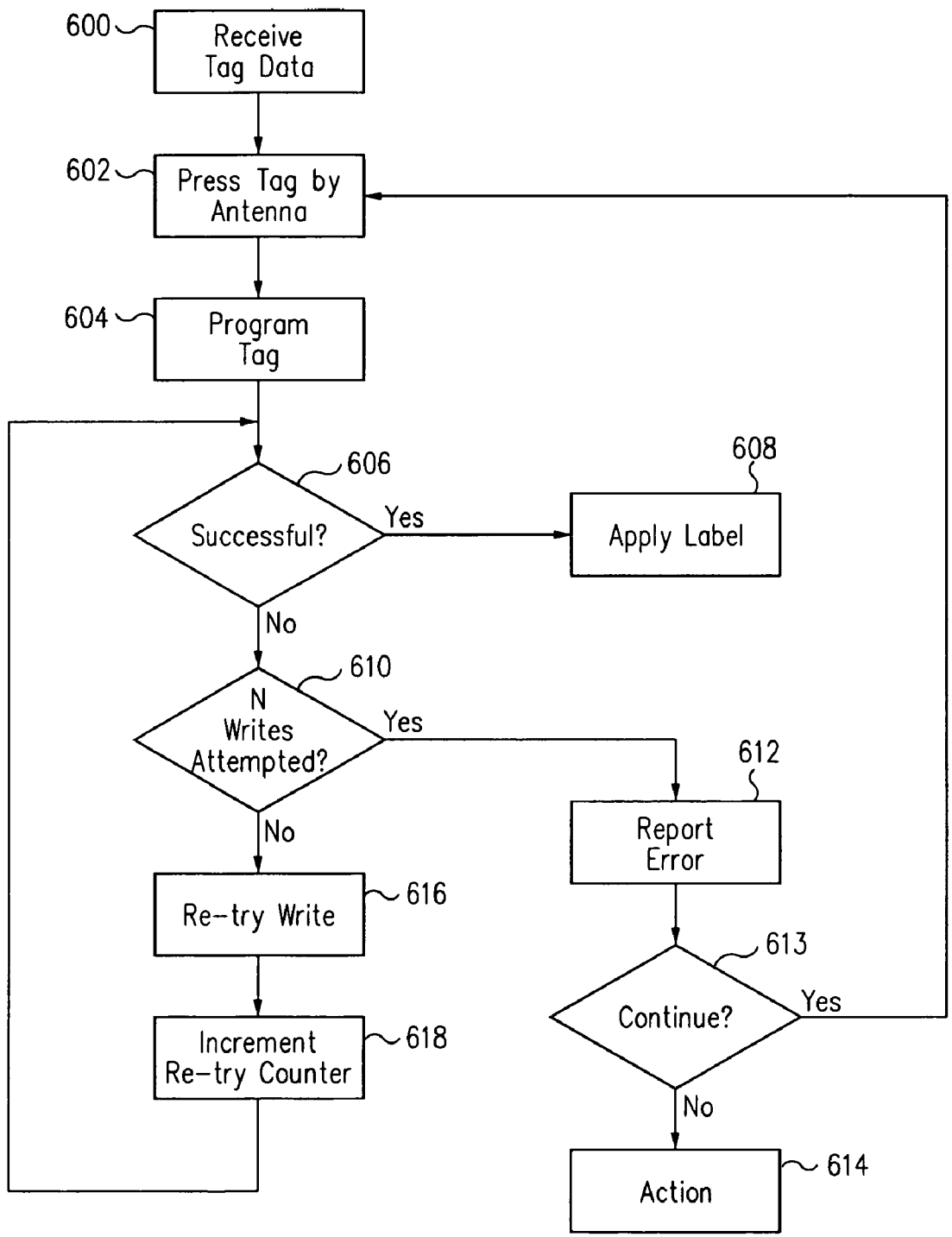
FIG. 6 is a flow chart showing a process for programming and applying an RFID label according to another embodiment.

FIG. 6 is a flow chart showing the processing of step 512 according to one embodiment. In step 600, the RFID program and apply device 402 receives tag data from host computer 102. In one embodiment, host computer 102 sends both print data and tag data in one file to both barcode print device 104 and RFID program device 402. In step 602, the RFID labels pass by an RFID antenna for programming. Conventional RFID programming systems may be used, or systems in which the label passes closely by (e.g., 0.3 inches) the RFID antenna, such as disclosed in commonly-owned U.S. patent application Ser. No. 10/660,856, filed Sep. 12, 2003, entitled "RFID Tag and Printer System", incorporated by reference in its entirety.

Data is then written onto the RFID tag via RFID circuitry and the RFID antenna in step 604. The write or programming operation is checked to determine if the data was written correctly in step 606. If the programming operation was successful, label 206 is applied to package 110 in step 608, such as by a label applicator. However, if the programming operation was not successful, the system determines if a certain number N of write operations have been attempted on the specific label in step 610. In one embodiment, N is between 1 and 5 and can be set by the user. If the number of attempts has reached N (i.e., N unsuccessful writes), an error is designated in step 612 and the RFID tag is rejected. The process can continue as shown, in step 613, in which case, the next RFID tag is positioned for programming in step 602. If the user does not choose, in step 613, to continue with the next tag, the appropriate action can be taken in step 614. In one embodiment, the user can select to halt the process, reject the package, provide an indication that the barcode label is correct and the RFID label is incorrect, or continue without applying any RFID label to the package. If, as determined in step 610, the maximum number of attempts has been reached, the system attempts a re-write of the same information on the next label in step 616. A counter for the number of write attempts on each label is incremented in step 618, and the programming operation is again verified in step 606.

Figure 7:
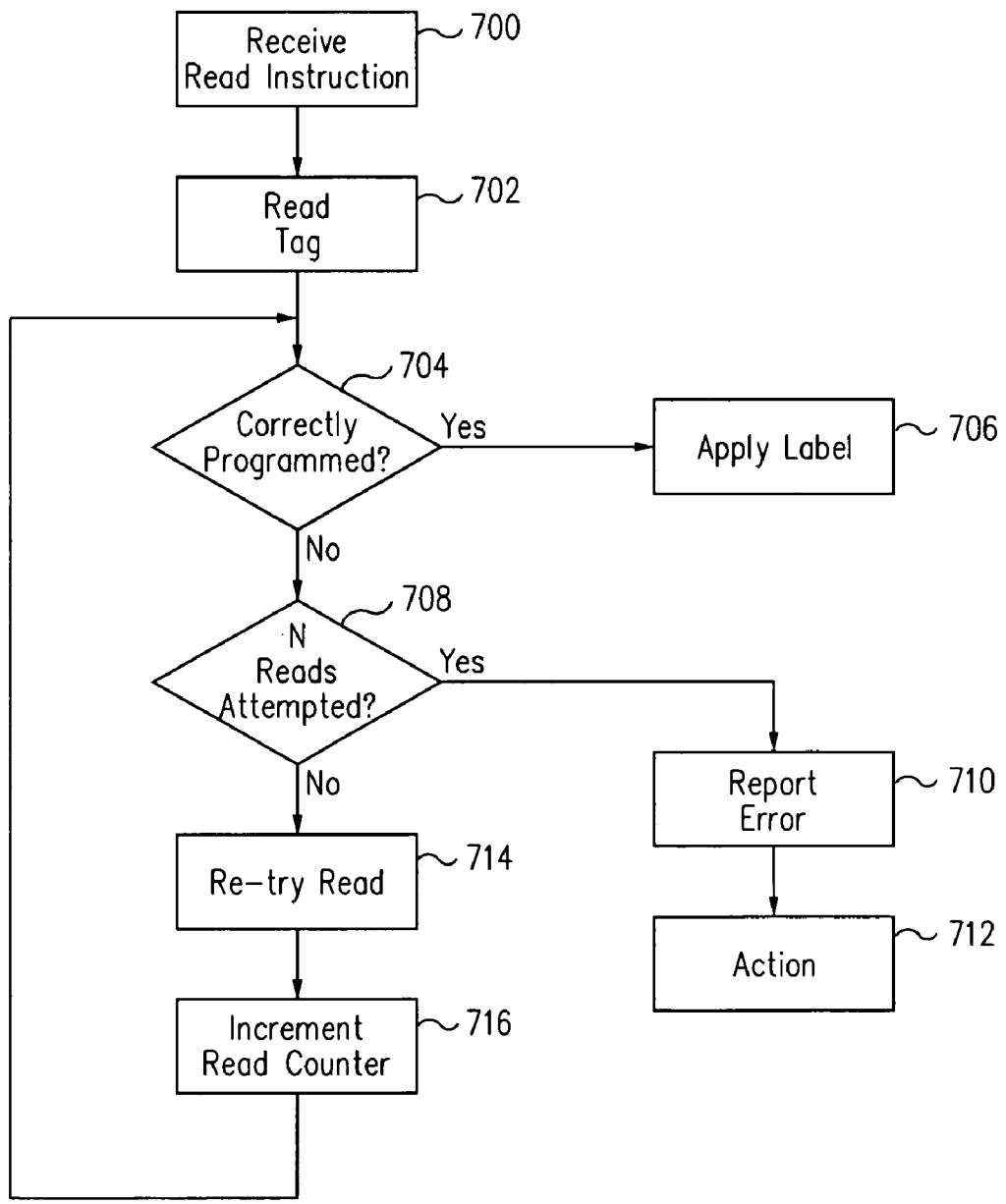
FIG. 7 is a flow chart showing a process for reading from and applying an RFID label according to another embodiment.

In another embodiment, RFID tags or labels are pre-programmed. FIG. 7 is a flow chart showing steps used during a reading and applying of RFID label 206 according to one embodiment. In step 700, device 202 is sent print image instructions and a read command to read the RFID tag. Note that device 202 in the other embodiment was called an RFID program and apply device. However, as is evident with this embodiment, device 202 only needs to read, instead of also programming, the RFID label or tag. As the RFID label passes over the RFID antenna, the RFID tag within the label is read, in step 702. Device 202 then determines, in step 704, whether the information read from the RFID tag is what should be programmed, i.e., if there is an error with the programming. If the data in the tag is correct, the label is applied to the package in step 706. However, if the read operation determines, in step 704, that the data stored in the tag is in error or cannot be read, device 202 determines if a certain number N read attempts have been made on the RFID label in step 708. In one embodiment, N is between 1 and 5, as determined by the user. If there has been N read attempts, an error in the tag is noted in step 710. Next, an appropriate action is taken in step 712. In one embodiment, the user can select to halt the process, reject the package, provide an indication that the barcode label is correct and the RFID label is incorrect, or continue without applying any RFID label to the package.

If, in step 708, the number of read attempts has not reached N, another read operation on the RFID tag is performed in step 714. A read counter indicating the number of read attempts on the tag is then incremented in step 716. The information in the tag is again checked for proper programming. Multiple read attempts allow the printer system to designate a faulty label with a higher level of confidence since some reads may not properly read the tag data, due to various factors, including interference from other sources.

With all the above embodiments, labels are advanced from the roll of labels for processing on the next RFID label. Processing continues until an end-of-label indicator is reached, the required number of labels have been passed or applied, or the user halts operation, such as when a faulty label is encountered or a job needs to be interrupted. Certain embodiments also allow the system to print EPC or other RFID information on a programmed RFID label. This provides an additional layer of information on the RFID label. Printing mechanisms can be with conventional means, and the printing can be done either before or after the RFID label is applied. Thus, the printing mechanism can be within or external to encoder 202 or device 402.

Figure 8:
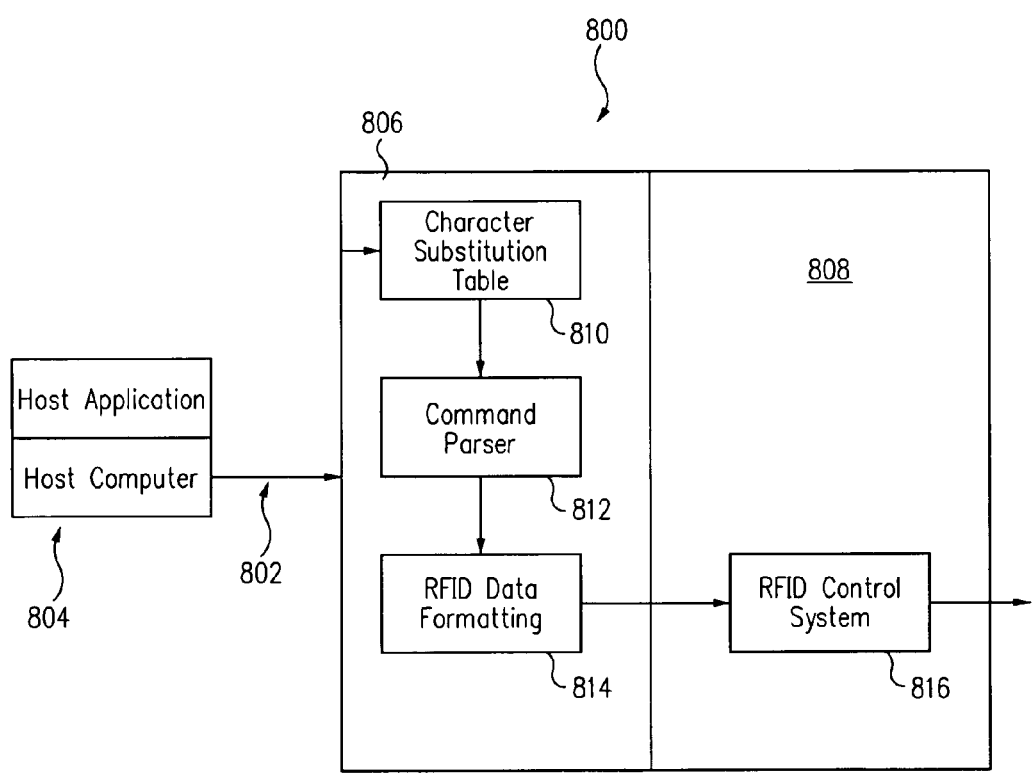
FIG. 8 is a block diagram of a system for extracting commands from a data stream and programming an RFID label according to one embodiment of the invention.

FIG. 8 is a block diagram showing a system 800 that extracts information from a data stream, transforms or converts portions of the data stream, if needed, and uses the portion to program or read the RFID tag. System 800 can be used as the program or read section of device 202. In one embodiment, the data stream portion is the barcode command. System 800 receives information via a data stream 802 from a host computer 804 that includes a host application, typically specific to the system through an electrical and software interface. The electrical interface can be any suitable communication means, such as described above. The data stream contains various commands for printing lines, boxes, text, barcodes, and other images. The data stream is transmitted to system 800 for programming or reading and also to a printer (not shown) in specific languages to cause the printer to print an image on a barcode label or other media.

Typically, different print languages and software interfaces are used by different manufacturers, such as uses a unique and specific language or software interface, Printronix, Zebra Technologies, Sato, TEC, and Intermec. To add RFID tag programming capability to the system, additional printer language commands must be developed. Further, in the normal situation these commands would have to be integrated into host software application, at significant cost and effort, in order for the system to deliver programmed RFID tags. In one embodiment, the data encapsulated in the barcode command is also programmed into the RFID tag. In this situation, the host application need not be modified when used in conjunction with additional software embedded in the system. The additional printer software detects the barcode command from the incoming data stream and generates RFID specific commands which include the barcode data. These in turn are routed to the RFID system for programming into the RFID label.

In FIG. 8, system 800 includes a data control section 806 that receives the data stream and an output control section 808 for programming and printing the RFID label. Character substitution table 810, within data control section 806, is coupled to receive the data stream from host computer 804. Character substitution table 810 intercepts any incoming barcode command, identifies the barcode of interest, transmits this barcode command to a command parser 812 for normal barcode printing, and in addition creates an RFID write command to allow programming of the RFID tag. Character substitution table 810 is a distinct software application that is downloaded to the printer to effect the data manipulation. The data manipulation can be diverse. In one embodiment, character substitution table 810 pre-parses the incoming data stream to identify the specific barcode command of interest and associated barcode data. The barcode data is extracted from the barcode command and applied to the RFID write-tag command. The resulting data string is transmitted to command parser 812 for normal command processing. The barcode command is also sent to command parser 812 according to conventional methods, as is known in the art.

Command parser 812 identifies RFID specific commands from data stream 802 and transmits the RFID specific commands to an RFID data formatting software module 814. Command parser 812 can also route print commands to the proper locations for printing. Module 814 formats the RFID data (or barcode data as was) sent with the RFID command to meet the formatting requirements of the RFID tag. In turn, this formatted RFID data is sent to an RFID control system 816, within output control 808, which includes an RFID reader (or transceiver) capable of programming the RFID tag embedded within the label. The reader is attached to an RFID antenna. The result is an RFID label that has been programmed with information from the data stream. This allows users to use their existing barcode application for RFID tags without extensive and costly modifications of the host computer application software. Verification of the programmed RFID tag can then be performed and applied, if desired, as discussed above.

In one embodiment, this same technique can be applied to thermal print systems that support more than one thermal printer language. The character substitution table can be configured to identify, for example, Zebra ZPL language barcode commands. Converting the barcode command from the data stream into an RFID command for programming the RFID tag can be utilized in systems that support various programming languages, such as from Zebra, Intermec, etc.

The above-described embodiments of the present invention are merely meant to be illustrative and not limiting. For example, the RFID label can be processed and applied prior to the barcode label. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. An RFID labeling system, comprising:
    an RFID encoder receiving a signal and programming an RFID label based on the signal, wherein the signal contains information for programming the RFID label;
    an RFID label applicator applying the programmed RFID label onto an object;
    a host computer sending the signal to the RFID encoder, wherein the signal is a data stream having a first programming language and comprising instructions for printing an image on an optically readable label, wherein the RFID encoder extracts information from data streams of different programming languages.

2. The system of claim 1, further comprising an optical label reader sending the signal to The RFID encoder, wherein the signal comprises data read from an optically readable label.

3. The system of claim 2, wherein the optically readable label is a barcode label.

4. The system of claim 1, wherein the RFID encoder verifies that information contained in an optically readable label matches data programmed on the RFID) label.

5. The system of claim 1, further comprising an optical label reader receiving the data steam for verifying that the optically readable label has been properly printed.

6. The system of claim 5, wherein properly printed comprises the optically readable label being readable and printed with the information corresponding to the data stream.

7. The system of claim 5, wherein the optical label reader is coupled to the RFID encoder for receiving the data stream.

8. The system of claim 1, wherein the optically readable label is a barcode label.

9. The system of claim 1, wherein the object is a container.

10. The system of claim 1, further comprising an optically readable label printer and applicator coupled to the host computer and receiving the data stream.

11. The system of claim 10, further comprising a conveyer system for moving the package past the optically readable label printer and applicator and the RFID encoder.

12. The system of claim 10, wherein the optically readable label printer and applicator applies the optically readable label to the package prior to the object passing by the RFID encoder.

13. A method for applying an RFID label onto a package containing an optically readable label, the method comprising:
    receiving a signal comprising RFID programming information from a host computer, wherein the signal is a data stream in a programming language;
    programming the RFID label using the RFID programming information;
    determining whether the optically readable label has been properly printed;
    determining whether the RFID label has been properly programmed; and
    applying the RFID label to the object if the optically readable label has been properly printed and the RFID label has been properly programmed, wherein the information for determining whether the RFID label has been properly programmed is extracted from data streams of different programming languages.

14. The method of claim 13, wherein the signal is read from a corresponding optically readable label.

15. The method of claim 14, wherein the optically readable label is a barcode label.

16. The method of claim 13, further comprising programming the RFID label using commands from the data stream.

17. The method of claim 13, wherein commands in the data stream are also used to print the optically readable label.

18. The method of claim 13, wherein determining whether the RED label has been properly programmed comprises comparing data on the optically readable label with data encoded in the RFID label.

19. The method of claim 13, wherein determining whether the optically readable label has been properly printed comprises determining whether the optically readable label is readable.

20. The method of claim 13, wherein determining whether the optically readable label has been properly printed comprises determining whether the optically readable label contains information from the data stream.

21. The method of claim 13, wherein determining whether the optically readable label has been properly printed comprises scanning the optically readable label.

22. A method of applying labels to packages in a system having an RFID encoder, the method comprising:
  printing an optically readable label based on information contained in a data stream from a host computer, wherein the data stream is of different programming languages and wherein the RFID encoder extracts information from data streams of different programming languages;
  applying the optically readable label onto a package;
  verifying whether an RFID label has been properly programmed based on information contained in the data stream or in the optically readable label; and
  applying the RFID label to a package if the RFID label has been properly programmed.

23. The method of claim 22, further comprising determining whether the optically readable label was printed properly.

24. The method of claim 23, wherein the determining comprises scanning the optically readable label.

25. The method of claim 23, wherein the determining comprises using information contained in the data stream.

26. The method of claim 22, further comprising writing to the RFID label using information from the data stream or the optically readable label before the verifying.

27. The method of claim 22, further comprising comparing the content of the optically readable label with the content of the RFID label.

* * * * *